United States Patent
Inoue et al.

(10) Patent No.: US 9,000,708 B2
(45) Date of Patent: Apr. 7, 2015

(54) MOTOR CONTROL CIRCUIT

(75) Inventors: Tomohiro Inoue, Yonago (JP); Kenichi Kishimoto, Osaka (JP); Yuji Hamada, Hyogo (JP)

(73) Assignees: Minebea Co., Ltd., Nagano (JP); Panasonic Corporation, Osaka (JP)

( * ) Notice: Subject to any disclaimer, the term of this patent is extended or adjusted under 35 U.S.C. 154(b) by 175 days.

(21) Appl. No.: 13/990,933

(22) PCT Filed: Dec. 8, 2011

(86) PCT No.: PCT/JP2011/078483
§ 371 (c)(1),
(2), (4) Date: May 31, 2013

(87) PCT Pub. No.: WO2012/077767
PCT Pub. Date: Jun. 14, 2012

(65) Prior Publication Data
US 2013/0257338 A1    Oct. 3, 2013

(30) Foreign Application Priority Data

Dec. 8, 2010  (JP) .................... 2010-273927

(51) Int. Cl.
| | | |
|---|---|---|
| G05B 13/00 | (2006.01) | |
| G05B 13/02 | (2006.01) | |
| G05B 19/416 | (2006.01) | |
| H02P 29/00 | (2006.01) | |
| H02P 23/00 | (2006.01) | |

(52) U.S. Cl.
CPC .............. *G05B 13/021* (2013.01); *G05B 13/02* (2013.01); *G05B 19/416* (2013.01); *H02P 29/00* (2013.01); *G05B 2219/41026* (2013.01); *H02P 23/0068* (2013.01)

(58) Field of Classification Search
USPC ............... 318/671, 152, 163, 767, 779, 491
See application file for complete search history.

(56) References Cited

U.S. PATENT DOCUMENTS

| | | | | |
|---|---|---|---|---|
| 4,335,383 A | * | 6/1982 | Berry ............................ | 342/115 |
| 5,335,189 A | * | 8/1994 | Takayama et al. ............. | 702/96 |
| 2006/0110140 A1 | * | 5/2006 | Harada ......................... | 388/804 |
| 2008/0024086 A1 | * | 1/2008 | Fukunishi ..................... | 318/619 |

FOREIGN PATENT DOCUMENTS

| | | |
|---|---|---|
| JP | A-58-076909 | 5/1983 |
| JP | A-07-322664 | 12/1995 |
| JP | A-2008-029177 | 2/2008 |

OTHER PUBLICATIONS

International Search Report issued in Application No. PCT/JP2011/078483; Dated Mar. 6, 2012 (With Translation).

* cited by examiner

*Primary Examiner* — Bentsu Ro
*Assistant Examiner* — Iftekhar Mustafa
(74) *Attorney, Agent, or Firm* — Oliff PLC

(57) ABSTRACT

To provide a motor control circuit that variably controls the speed of a motor, in which an appropriate control gain corresponding to the speed of the motor that is set can be automatically set. The motor control circuit includes a period error signal output means, a speed error signal output means and a gain correction means.

6 Claims, 4 Drawing Sheets

F I G. 1
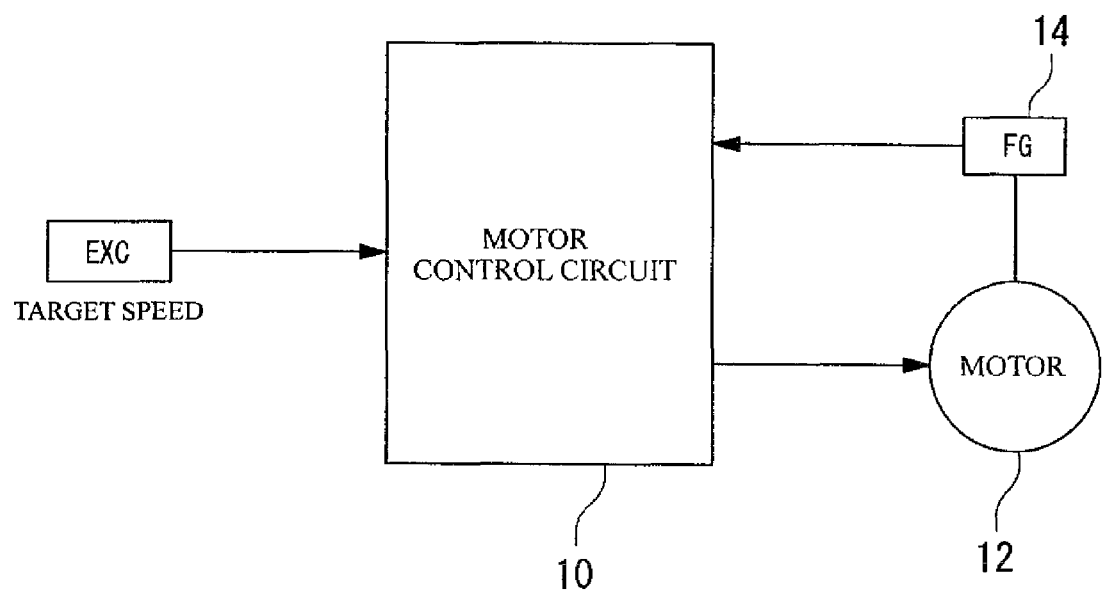

F I G. 4
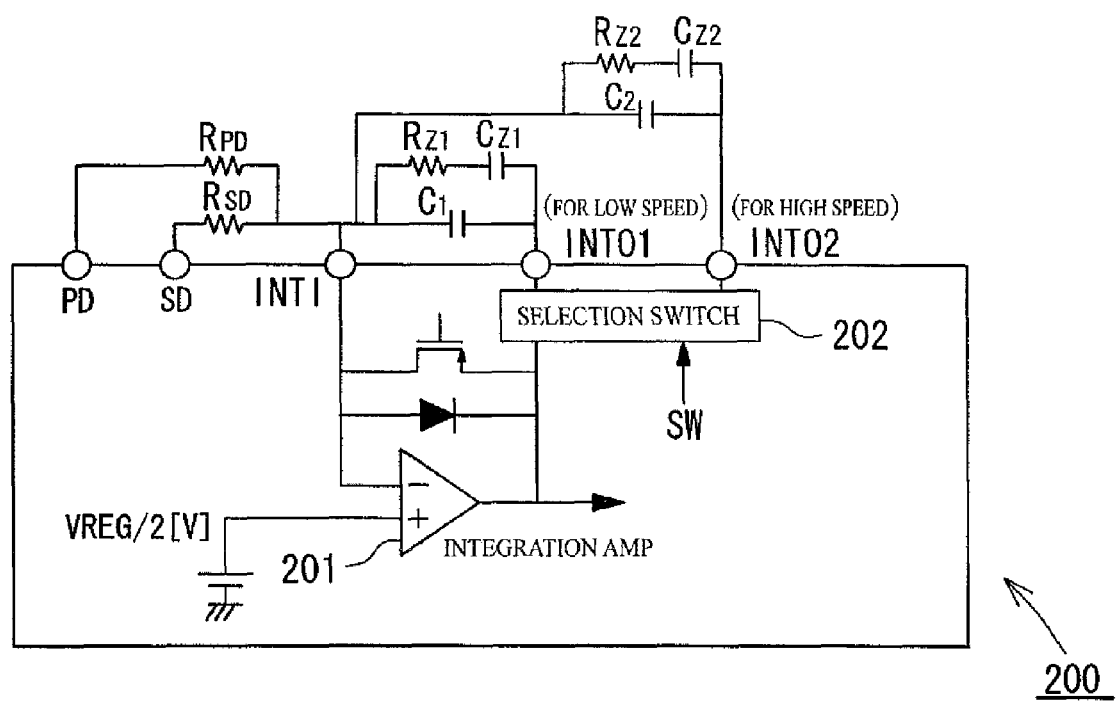

MOTOR CONTROL CIRCUIT

TECHNICAL FIELD

The present invention relates to a motor control circuit that variably controls the rotational speed of a motor.

BACKGROUND ART

Recently, technical advances in OA equipment such as copying machines and page printers are progressing with relation to color, precision, and digitalization. In accordance with such advances, motors used in such equipment must be able to operate with high rotational speed accuracy over a wide range of rotational speeds. Further, control circuits for controlling such motors must be equipped with optimal control functions at every number of rotations over a wide range of rotational speeds.

Conventionally, a digital servo circuit 100 as shown in FIG. 3 has been proposed for digitally controlling the speed and phase of a motor (for example, refer to Patent Literature 1). The digital servo circuit 100 shown in FIG. 3 is an example of a motor control circuit that controls the speed and phase of a drum motor 102 and a capstan motor 103 used in VTR.

To a servo IC 117 of the digital servo circuit 100, detection signals corresponding to the speed and phase of the drum motor 102 are respectively supplied from terminals 104a and 104b, an output from a speed servo circuit 119 is supplied to a mixer 127 via a multiplier 123, and an output of a phase servo circuit 120 is supplied to the mixer 127 via a digital filter and a multiplier 24. A PWM signal that appears in an output of the mixer 127 is added to the drum motor 102 via a low-pass filter 109 and a drive amp 115 (the same applies to the capstan motor 103, and thus an explanation thereof will be omitted).

The digital servo circuit 100 is configured such that control gains (i.e. coefficients KDS, KDP, KOS, and KOP) corresponding to the VTR operation states of speed servo circuits 119 and 121 and phase servo circuits 120 and 122 are furnished from an external microprocessor 118. Thereby, the adjustment location on the output side of the servo IC 117 is eliminated and the number of parts is reduced, and thus high performance and automatic adjustment are achieved in the digital servo circuit 100.

In addition, in a motor control circuit, it is known that when performing control of speed that changes over a wide range, it is necessary to set an optimal control gain for each speed within the speed variable range. Referring to FIG. 4, a typical example of such control gain setting will be explained below.

In a motor control circuit 200 shown in FIG. 4, a speed error signal SD corresponding to a deviation between a detected rotational speed of the motor and a target speed and a phase error signal PD corresponding to a deviation between a detected motor phase and a reference phase are added via a speed input resistor $R_{PD}$ and a phase input resistor $R_{SD}$, and then the signals after addition are integrated by an integration amp 201. Thereby, a control signal (for example, a torque command signal) for a subsequent motor drive circuit (not illustrated) is obtained.

The motor control circuit 200 includes a low speed-side integration constant circuit (a resistor $R_{Z1}$ and a capacitor $C_{Z1}$) that determines a control gain when the motor is rotating at a low speed, and a high speed-side integration constant circuit (a resistor $R_{Z2}$ and a capacitor $C_{Z2}$) that determines a control gain when the motor is rotating at a high speed. One end of the low speed-side integration constant circuit is connected to a low speed integration output terminal INTO1, and one end of the high speed-side integration constant circuit is connected to a high-speed integration output terminal INTO2. The other end of the low speed-side integration constant circuit and the other end of the high speed-side integration constant circuit are connected to a common integration input terminal INTI. The motor control circuit 200 also includes a selection switch 202 that switches which of the low speed integration output terminal INTO1 and the high-speed integration output terminal INTO2 is connected to the integration amp 201.

Here, in the motor control circuit 200, the control gain is normally selected by a signal input from the outside through an interface. The selection switch 202 switches between the low speed integration output terminal INTO1 and the high-speed integration output terminal INTO2 in response to a switch signal SW that is associated with the signal input from the outside. Thereby, appropriate control gains are set during low speed rotation and high-speed rotation of the motor.

CITATION LIST

Patent Literature

Patent Literature 1: JP 58-76909 A

SUMMARY OF INVENTION

Technical Problem

However, in the digital servo circuit 100 shown in FIG. 3, the external microprocessor 118 (or a memory) is necessary in order to set the control gain. In the motor control circuit 200 shown in FIG. 4, since there is a dedicated integration constant circuit for each corresponding speed range (for example, a high speed range and a low speed range), a resistor and a capacitor that constitute the integration constant circuit are necessary for each integration constant circuit. Also, if the number of speed ranges is increased because, for example, the speed ranges are subdivided for the purpose of executing more precise control, the number of corresponding integration constant circuits must also be increased.

Considering the above problems, an object of the present invention is to provide a motor control circuit that variably controls the rotational speed of a motor, in which an appropriate control gain corresponding to the speed of the motor that is to be set can be automatically set.

Solution to Problem

The below-described embodiments exemplify constitutions of the present invention, and will be explained in an itemized manner in order to facilitate the understanding of the various constitutions of the present invention. Each item is not meant to limit the technical scope of the present invention, and substitutions or deletions of a portion of the constituent elements of each item as well as additions of other constituent elements upon referring to the detailed description of the preferred embodiments are included within the technical scope of the invention.

(1) A motor control circuit in which a detection signal of a frequency that is proportional to a speed of a motor is input from a speed detection means attached to the motor, a reference signal having a frequency corresponding to a target speed is input from outside, and a period of the detection signal and a period of the reference signal are compared to variably control a speed of the motor, the motor control circuit including: a period error signal output means that outputs a period error signal corresponding to a difference between the period of the detection signal and the period of the reference signal; a speed error signal output means that outputs a speed error signal obtained by multiplying the period error signal by a speed gain; and a gain correction means that uses a ratio of a correction reference period relative to the period of the reference signal as a correction amount, and squares the correction amount and multiplies it by a predetermined speed gain of the speed error signal output means to correct the predetermined speed gain (claim 1).

According to the motor control circuit in the item, it is possible to automatically correct the speed gain in accordance with variations in the period (target speed) of the reference signal that is input from the outside. In the motor control circuit that variably controls the speed of the motor, when the speed of the motor varies in accordance with variations in the target speed, the control characteristics for each speed can be optimized.

Further, in the motor control circuit in the item, since the correction of the speed gain corresponding to the target speed is carried out automatically within the motor control circuit, an interface or the like for inputting a speed gain switching signal from the outside is unnecessary, and the control characteristics can be optimized with a simple and inexpensive structure.

(2) In the motor control circuit according to the item (1), the motor control circuit further includes a phase error signal output means that outputs a phase error signal obtained by multiplying a phase gain by a phase difference signal corresponding to a difference between a phase of the reference signal and a phase of the detection signal, and the gain correction means multiplies the correction amount by a predetermined phase gain of the phase error signal output means to correct the predetermined phase gain (claim 2).

According to the motor control circuit in the item, it is possible to automatically correct the speed gain and the phase gain in accordance with variations in the period of the reference signal that is input from the outside. In the motor control circuit that variably controls the speed of the motor, when the speed of the motor varies in accordance with variations in the target speed, the control characteristics for each speed can be more effectively optimized.

(3) In the motor control circuit according to the item (2), the motor control circuit includes: a period detection counter into which the detection signal is input, the period detection counter outputting a detected period count value corresponding to a period of the detection signal counted based on a reference clock; a period detection counter into which the reference signal is input, the period detection counter outputting a reference period count value corresponding to a period of the reference signal counted based on the reference clock; and a phase detection counter into which the detection signal and the reference signal are input, the phase detection counter outputting a phase difference count value corresponding to a difference between a phase of the reference signal and a phase of the detection signal counted based on the reference clock, the period error signal output means has a difference calculation means that calculates the period error signal by differential calculation between the detected period count value and the reference period count value, and the gain correction means includes the correction reference period as a correction reference count value corresponding to the correction reference period, the gain correction means also including a division means that calculates the correction amount by dividing the correction reference count value by the reference period count value and a square calculation means that squares the calculated correction amount (claim 3).

According to the motor control circuit in the item, the motor control circuit in which the speed gain and the phase gain can be automatically corrected in accordance with variations in the period of the reference signal that is input from the outside can be configured as a fully digital processing circuit that does not use an analog circuit (for example, an integration amp, a resistor, and a capacitor). In particular, when the motor control circuit is configured as an integrated circuit (IC), the high performance motor control circuit can be realized by an IC with a small chip area at low cost utilizing a microfabrication process in which many digital circuits are constituted in a small area.

(4) In the motor control circuit according to any one of the items (1) to (3), the gain control means has a plurality of the correction reference periods (claim 4).

According to the motor control circuit in the item, correction of the optimal speed gain and phase gain can be carried out flexibly and easily in a motor with a broad speed variable range.

Advantageous Effects of Invention

The motor control circuit according to the present invention, with the above-described structures, variably controls the speed of the motor, so that an appropriate control gain corresponding to the speed of the motor that is set can be automatically set and the control characteristics thereof can be optimized.

BRIEF DESCRIPTION OF DRAWINGS

FIG. 1 is a block diagram that schematically illustrates a motor drive system including a motor control circuit according to one embodiment of the present invention.

FIG. 4 is a circuit constitution diagram illustrating another example of a conventional motor control circuit.

REFERENCE SIGNS LIST

Figure 2:
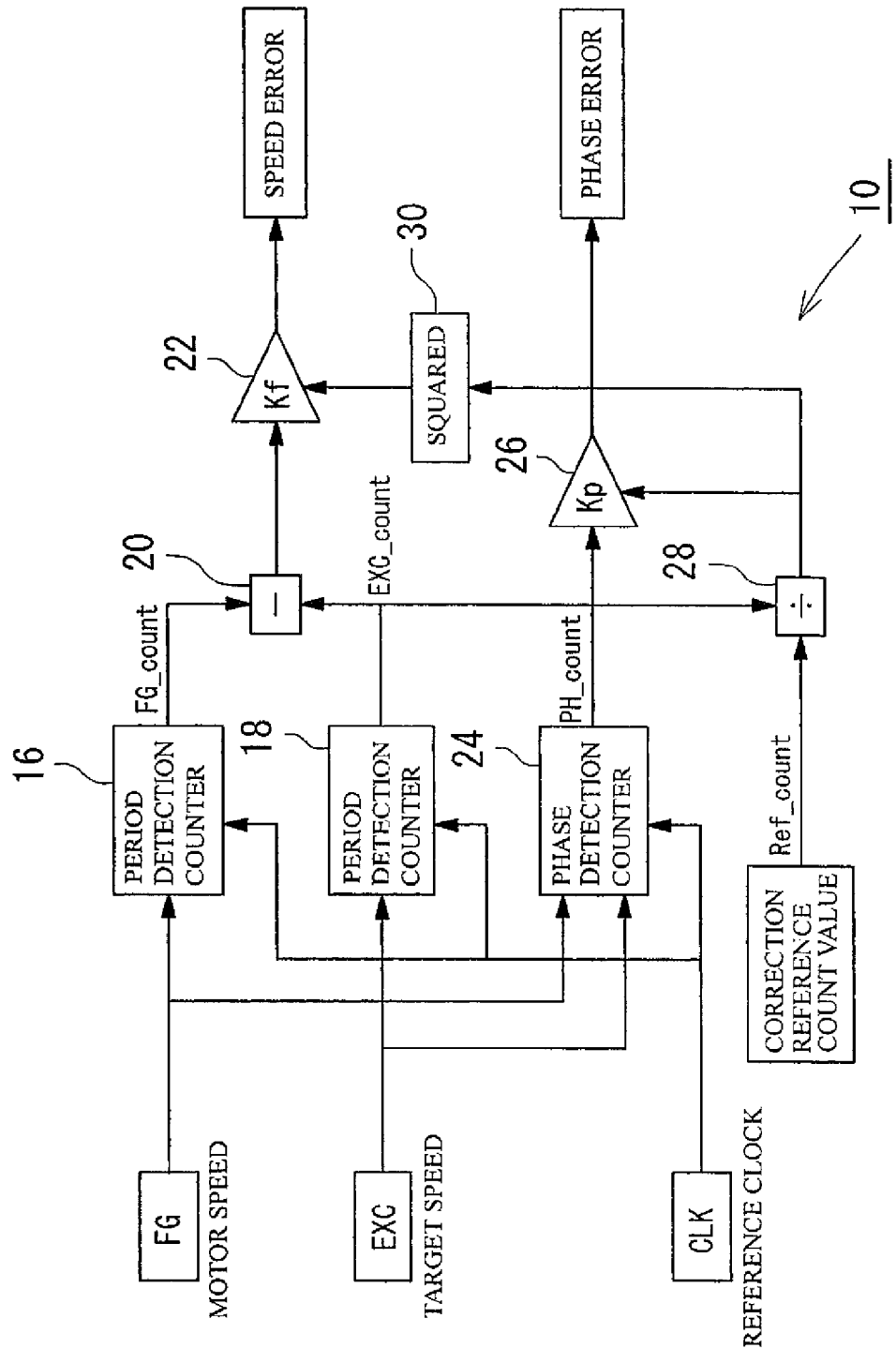
FIG. 2 is a functional block diagram that illustrates the essential parts of the motor control circuit according to one embodiment of the present invention.
Figure 3:
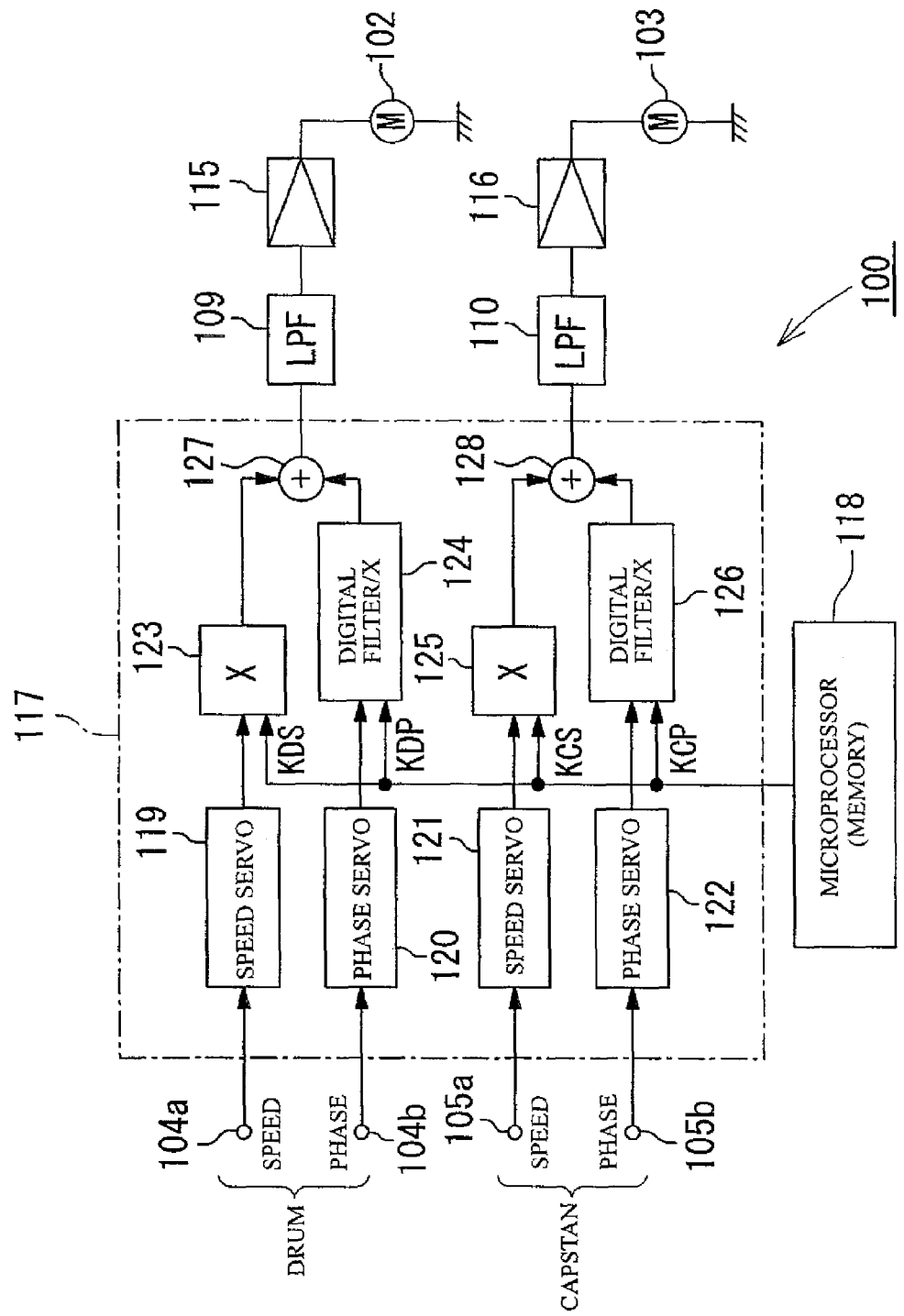
FIG. 3 is a circuit constitution diagram illustrating one example of a conventional motor control circuit.

10: motor control circuit
12: motor
14: frequency generator (speed detection means)
16, 18: period detection counter
20: difference calculation means (period error signal output means)
22: multiplication means (speed error signal output means)
24: phase detection counter
26: multiplication means (phase error signal output means)
28: division means
30: square calculation means

DESCRIPTION OF EMBODIMENTS

Embodiments of the present invention will be explained below referring to the attached drawings.

FIG. 1 schematically illustrates a motor drive system in which a motor control circuit 10 according to the present embodiment is suitably applied. The motor drive system shown in FIG. 1 includes a motor (for example, a brushless motor) 12 and the motor control circuit 10. A frequency generator (hereinafter also referred to as "FG") 14 is attached as a speed detection means to the motor 12. Into the motor control circuit 10, a frequency detection signal (hereinafter, also referred to as an "FG signal") proportional to the speed (rotational speed) of the motor 12 is input from the FG 14, and a reference signal EXC is input from the outside (for example, a host system of the motor control circuit 10).

In the motor drive system shown in FIG. 1, the reference signal EXC is a signal having a frequency corresponding to a target speed of the motor, and it is assumed that this frequency (in other words, the target speed) is made to fluctuate depending on, for example, various operating conditions of the motor 12. The motor control circuit 10 compares the period of the FG signal and the period of the reference signal EXC to variably control the speed of the motor 12. The structure of the motor control circuit 10 will be explained in detail below referring to FIG. 2.

FIG. 2 is a functional block diagram illustrating the essential parts of the motor control circuit 10 according to the present embodiment. The motor control circuit 10 includes a period detection counter 16 into which the FG signal is input, a period detection counter 18 into which the reference signal EXC is input, and a phase detection counter 24 into which the FG signal and the reference signal EXC are input. A common reference clock CLK having a constant period is supplied to the period detection counters 16 and 18 and to the phase detection counter 24.

Here, the motor control circuit 10 preferably includes a means (not illustrated) for generating the reference clock CLK therewithin. However, in the motor control circuit 10 according to the present invention, the reference clock CLK can also be input from the outside.

The motor control circuit 10 also includes a period error signal output means consisting of a difference calculation means 20, a speed error signal output means consisting of a multiplication means 22 including a predetermined speed gain Kf, and a phase error signal output means consisting of a multiplication means 26 including a predetermined phase gain Kp. The motor control circuit 10 further includes a gain correction means including a division means 28 and a square calculation means 30.

In the present embodiment, the specific structures of the period detection counters 16 and 18 can be any appropriate structure as long as they count a period of an input signal based on the reference clock CLK and output the counted value (count value). For example, the period detection counters 16 and 18 can include a free-run counter that counts up for each input of the pulse signal that constitutes the reference clock CLK and an input-capture register that detects a rise in the input signal and retains the count value of the free-run counter at that point in time, so as to output a pulse number of the reference clock CLK input during one period of the input signal as a count value corresponding to the period of the input signal by calculating the difference between the count values retained at two following points in time.

Similarly, in the present embodiment, the specific structure of the phase detection counter 24 can be any appropriate structure as long as it counts a phase difference between two input signals based on the reference clock CLK and outputs the counted value (count value). For example, the phase detection counter 24 can include a free-run counter and an input-capture register similar to the period detection counters 16 and 18, so as to calculate the difference in the count values at the time of a rise in one of the input signals and at the time of a rise in the other input signal and output the calculated value as a count value corresponding to a phase difference between the two signals.

In the motor control circuit 10, a detected period count value FG_count corresponding to the period of the FG signal is output from the period detection counter 16 into which the FG signal is input, and a reference period count value EXC_count corresponding to the period of the reference signal EXC is output from the period detection counter 18 into which the reference signal EXC is input. The detected period count value FG_count and the reference period count value EXC_count are input into the difference calculation means 20, and the difference calculation means 20 calculates the difference between the detected period count value FG_count and the reference period count value EXC_count and outputs the obtained value as a period error signal. Next, the period error signal is input into the multiplication means 22, and the multiplication means 22 multiplies a speed gain (which has been corrected as described below) by the period error signal and outputs the obtained value as a speed error signal.

In the motor control circuit 10, a phase difference count value PH count corresponding to the phase difference between the FG signal and the reference signal EXC is output as a phase difference signal from the phase detection counter 24. Next, the phase difference signal is input into the multiplication means 26, and the multiplication means 26 multiplies a phase gain (which has been corrected as described below) by the phase difference signal and outputs the obtained value as a phase error signal.

The motor control circuit 10 can also include a known drive circuit (not illustrated) for driving the motor 12 based on the speed error signal and the phase error signal output respectively from the multiplication means 22 and the multiplication means 26.

Here, the gain correction means of the motor control circuit 10 has a pre-set correction reference period, and uses a correction amount, which is a ratio of the correction reference period relative to the period of the reference signal EXC (in other words, the correction reference period/the reference signal EXC period), to correct the speed gain by multiplying the square of the correction amount by the predetermined speed gain Kf of the multiplication means 22, and to correct the phase gain by multiplying the correction amount by the predetermined phase gain Kp of the multiplication means 26.

Specifically, in the motor control circuit 10, the gain correction means retains the correction reference period as a corresponding correction reference count value Ref_count. In the gain correction means, the reference period count value EXC_count and the correction reference count value Ref_count are input into the division means 28, and in the division means 28, the correction amount is calculated by "Ref_count/EXC_count". The correction amount is squared by the square calculation means 30, and then multiplied by the speed gain Kf of the multiplication means 22. Thereby, the speed gain Kf is corrected. Further, in the multiplication means 26, the correction amount is directly multiplied by the phase gain Kp, and thereby the phase gain Kp is corrected.

In this way, in the motor control circuit 10, the speed gain Kf and the phase gain Kp are automatically corrected in accordance with the period of the reference signal EXC (the reference period count value EXC_count). Thus, even if the period of the reference signal EXC (in other words, the target speed input from the outside) varies, an appropriate speed gain and phase gain can be set relative to each speed and the control characteristics thereof can be optimized.

The present invention is not limited by theory, but the correction of the speed gain Kf by the square of the correction amount can be explained as follows.

In general, a speed error is defined as speed error=motor speed−target speed, and is represented as follows:

speed error = motor speed − target speed = (1/the period of the $FG$ signal −

1/the period of the reference signal $EXC$) × a coefficient =

(period error/(the period of the $FG$ signal × the period of the reference signal $EXC$)) × a coefficient (provided that the period error = (the period of the reference signal $EXC$ − the period of the $FG$ signal).

Therefore, in the multiplication means 22, by incorporating the factor "1/(the period of the FG signal×the period of the reference signal EXC)" into the gain, the speed error can be obtained with high precision compared to simply multiplying a predetermined gain by the period error.

Thus, in the present invention, in a steady state in which the motor speed is close to the target speed, preferred correction of the speed gain Kf can be achieved by the simple means of squaring the correction amount, based on the fact that 1/(the period of the FG signal×the period of the reference signal EXC) can be approximated to 1/(the period of the reference signal EXC)$^2$.

Further, in the gain correction means of the motor control circuit 10, as described above, "the correction reference period/the period of the reference signal EXC" (Ref_count/EXC_count) is used as the correction amount for correcting the speed gain Kf and the phase gain Kp instead of "1/the period of the reference signal EXC" itself (this corresponds to setting a correction reference speed proportional to "1/the correction reference period", and using a value obtained by normalizing the target speed that is proportional to "1/the period of the reference signal EXC" with the correction reference speed as the target speed for correction). To be explained below, this constitution is particularly effective in control of a motor with a broad speed variable range.

In the control of a motor with a broad speed variable range, there are cases that demand control characteristics that differ in the motor control circuit in accordance with each of a plurality of speed ranges (for example, a low speed range, a medium speed range, and a high speed range) to which the target speed can belong. In response to such a demand, the motor control circuit 10 can be configured to include a plurality of appropriate correction reference periods (for example, correction reference periods for a low speed range, a medium speed range, and a high speed range) in accordance with each of the plurality of speed ranges, and the correction reference period (specifically, the corresponding correction reference count value Ref_count) used in calculating the correction amount is switched depending on the speed range to which the target speed belongs.

Therein, the motor control circuit 10 is preferably configured so that the correction reference period is automatically switched in conjunction with the period of the reference signal EXC (the reference period count value EXC_count).

Thereby, even if the target speed varies over a wide range, the correction amount of the control gain (the speed gain and the phase gain) can be flexibly and easily switched so that the control characteristics of the motor control circuit 10 are optimized. Further, even if the number of speed ranges is increased, this can be easily dealt with by increasing the correction reference periods retained as data in the gain correction means without the need to increase the number of parts of the motor control circuit 10.

The motor control circuit 10 configured as described above handles the period of the FG signal, the period of the reference signal EXC, and the phase difference between the FG signal and the reference signal EXC as count values (i.e. numerical data), and the subsequent processing can all be executed as calculations of numerical data. Therefore, the motor control circuit 10 can be realized as a fully digital processing circuit that does not use an analog circuit. Therein, the constituent components of the motor control circuit 10 can be realized by any appropriate hardware or software or combination thereof as long as they fulfill the functions of the functional blocks explained referring to FIG. 2. This feature of the motor control circuit 10 is particularly advantageous when the motor control circuit 10 is configured as an integrated circuit (IC), in terms of realizing a high performance motor control circuit by an IC with a small chip area at low cost.

The present invention has been explained above based on preferred embodiments thereof, but the present invention is not limited to the embodiments explained above. For example, the present invention also includes cases in which an arbitrary constituent component of the motor control circuit is constituted by an analog circuit having an equivalent function.

The invention claimed is:

1. A motor control circuit in which a detection signal of a frequency that is proportional to a speed of a motor is input from a speed detection means attached to the motor, a reference signal having a frequency corresponding to a target speed is input from outside, and a period of the detection signal and a period of the reference signal are compared to variably control a speed of the motor, the motor control circuit comprising:
a period error signal output means that outputs a period error signal corresponding to a difference between the period of the detection signal and the period of the reference signal;
a speed error signal output means that outputs a speed error signal obtained by multiplying the period error signal by a speed gain; and
a gain correction means that uses a ratio of a correction reference period relative to the period of the reference signal as a correction amount, and squares the correction amount and multiplies it by a predetermined speed gain of the speed error signal output means to correct the predetermined speed gain.

2. The motor control circuit according to claim 1, further comprising a phase error signal output means that outputs a phase error signal obtained by multiplying a phase gain by a phase difference signal corresponding to a difference between a phase of the reference signal and a phase of the detection signal,
wherein the gain correction means multiplies the correction amount by a predetermined phase gain of the phase error signal output means to correct the predetermined phase gain.

3. The motor control circuit according to claim 2, comprising:
a period detection counter into which the detection signal is input, the period detection counter outputting a detected period count value corresponding to a period of the detection signal counted based on a reference clock;
a period detection counter into which the reference signal is input, the period detection counter outputting a reference period count value corresponding to a period of the reference signal counted based on the reference clock; and a phase detection counter into which the detection signal and the reference signal are input, the phase detection counter outputting a phase difference count value corresponding to a difference between a phase of the reference signal and a phase of the detection signal counted based on the reference clock, wherein the period error signal output means has a difference calculation means that calculates the period error signal by differential calculation between the detected period count value and the reference period count value, and the gain correction means includes the correction reference period as a correction reference count value corresponding to the correction reference period, the gain correction means also including a division means that calculates the correction amount by dividing the correction reference count value by the reference period count value and a square calculation means that squares the calculated correction amount.

4. The motor control circuit according to claim 1, wherein the gain control means has a plurality of the correction reference periods.

5. The motor control circuit according to claim 2, wherein the gain control means has a plurality of the correction reference periods.

6. The motor control circuit according to claim 3, wherein the gain control means has a plurality of the correction reference periods.

* * * * *